Jan. 7, 1969  K. J. AUSTGEN  3,420,193
FREIGHT VEHICLE FLOOR STRUCTURE
Filed Sept. 16, 1966  Sheet 1 of 3
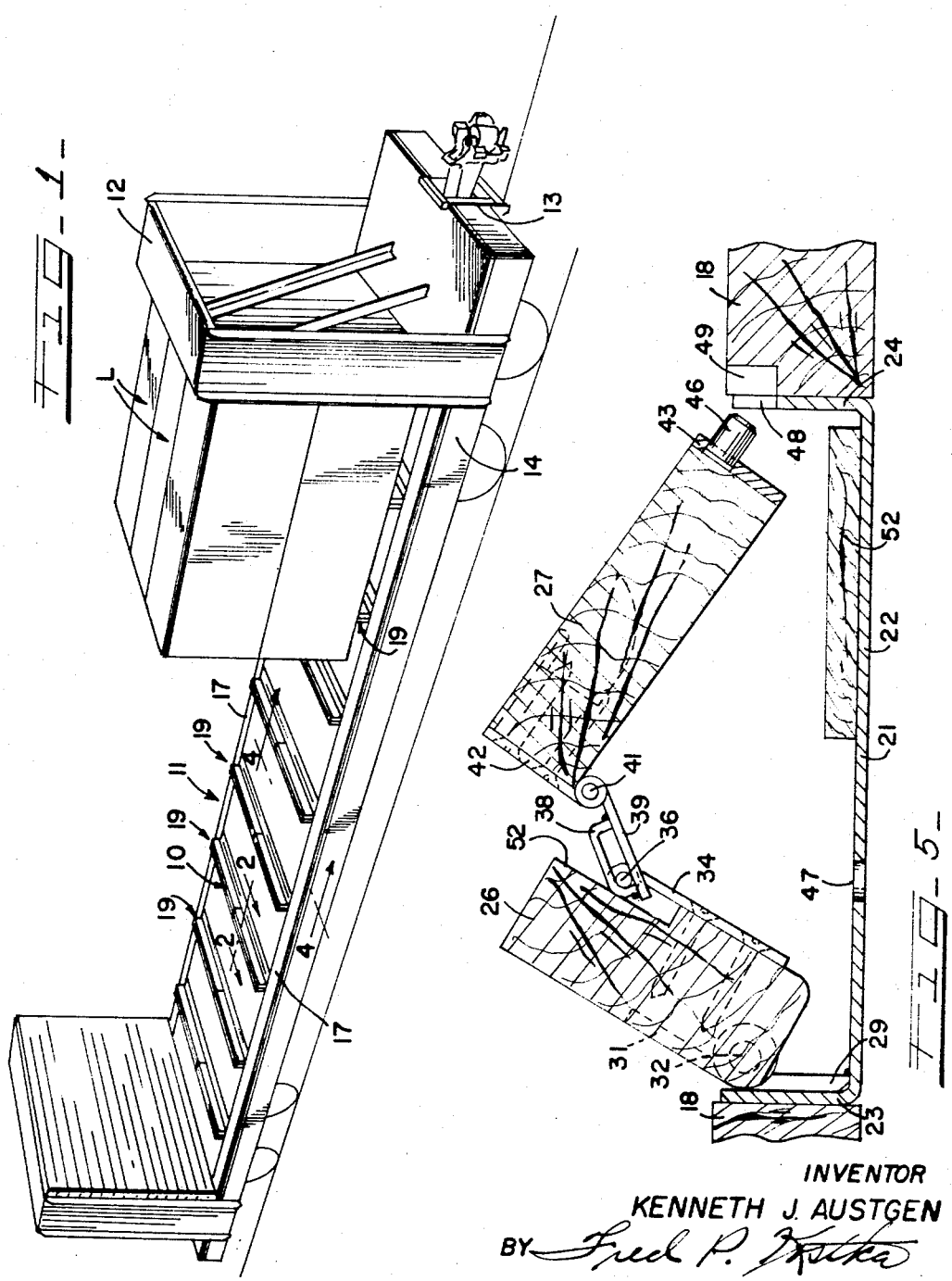
INVENTOR
KENNETH J. AUSTGEN
BY Fred P. Kostka
ATT'Y.

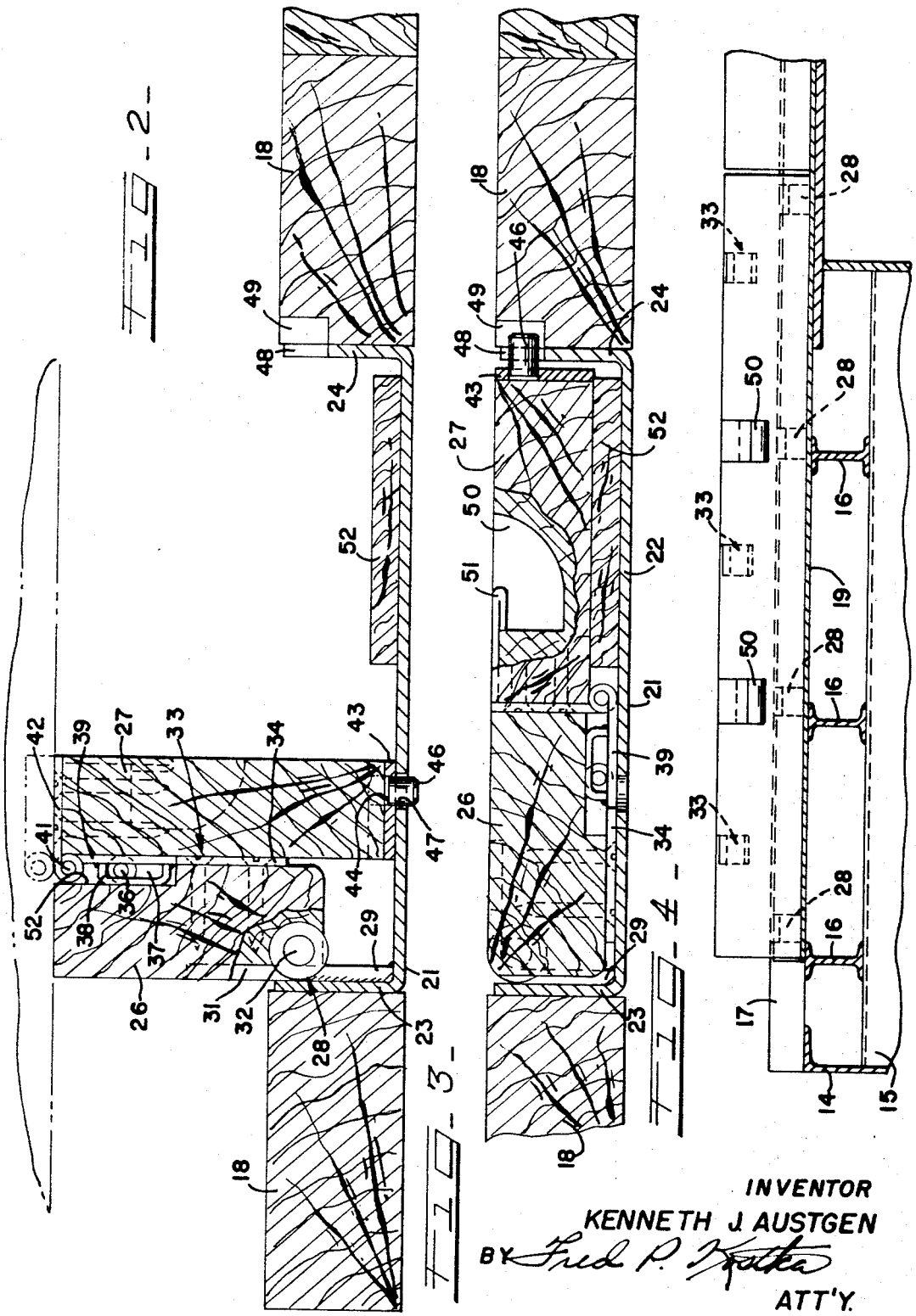

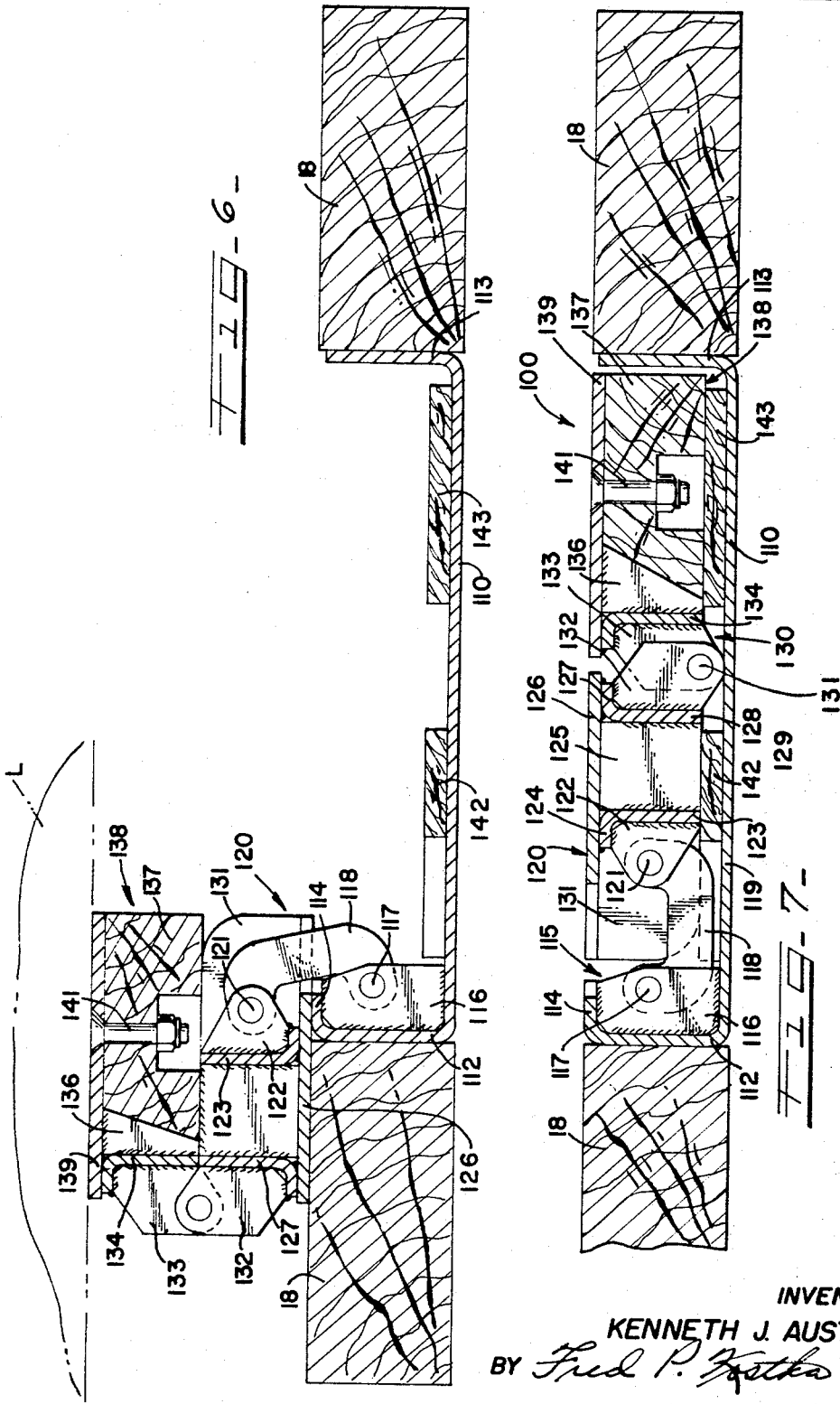

United States Patent Office 3,420,193
Patented Jan. 7, 1969

---

3,420,193
FREIGHT VEHICLE FLOOR STRUCTURE
Kenneth J. Austgen, Griffith, Ind., assignor to Pullman Incorporated, Chicago, Ill., a corporation of Delaware
Filed Sept. 16, 1966, Ser. No. 580,123
U.S. Cl. 105—422                                10 Claims
Int. Cl. B61d *17/10;* B61d *3/16;* B60p *7/06*

The present invention relates to vehicles and more particularly to a floor structure for vehicles of the flat bed type.

Vehicles of the flat bed type are frequently employed to transfer cargo which is supported or mounted on pallets to facilitate the loading and unloading of the cargo. The pallets are constructed to provide support for the cargo and also to permit the application of the tines of a lift fork on the underside of the pallet to load and unload the cargo on a transporting vehicle.

It is a principal object of the present invention to provide a vehicle floor structure which eliminates the need for the use of the pallets on the freight vehicle.

This is accomplished generally by providing the freight vehicle with a floor structure comprising a plurality of transversely extending floor boards which are fixed to the underframe in side-by-side abutting and co-planar relationship in the usual manner. The floor is constructed and arranged to have at least one set of spaced pairs of adjacent flood board assemblies which are movable into and out of planar relationship with the fixed floor boards to provide two lengthwise spaced raised floor platform sections on which the lading is supported in a spanning relationship. When the movable floor boards are in the raised platform position there are provided two lengthwise spaced channels defined by the fixed floor boards into which the tines of a lift fork may be inserted during the loading and unloading of the cargo.

Further objects and features will hereinafter appear.

In the drawings:

FIG. 1 is a perspective view of a railway car embodying a floor structure constructed in accordance with the principles of the present invention;

FIG. 2 is a fragmentary cross-sectional view taken longitudinally of the floor structure and through the movable board sections, generally along the lines 2—2 of FIG. 1, and showing one form of a movable floor board platform assembly constructed in accordance with the principles of the present invention;

FIG. 3 is a fragmentary cross-sectional view similar to FIG. 2 but showing the movable floor board platform assembly in a planar position relative to the fixed floor board structure;

FIG. 4 is a cross-sectional view taken generally along the lines 4—4 of FIG. 1 and showing the movable floor board platform assembly in the raised operative position;

FIG. 5 is a cross-sectional view taken longitudinally of the car and showing the movable floor board platform in a position intermediate the raised position of FIG. 2 and the recessed position of FIG. 3;

FIG. 6 is a cross sectional view taken longitudinally of the car and showing another embodiment of a movable floor board platform; and FIG. 7 is a cross sectional view of the movable floor board assemblies of FIG. 6 in the recessed position.

Referring now in particular to FIG. 1 of the drawings, the floor structure 10, constructed in accordance with the present invention, is shown on a railway car of the flat bed bulkhead type. It is to be understood, however, that the floor structure 10 is adapted to be applied to any type of freight carrying vehicle such as, for example, a flat bed semi-trailer or trailer. The bulkhead car shown, comprises generally an underframe 11 on which there are spaced from the respective ends of the car, bulkheads 12 which may be constructed in the usual manner. This type of bulkhead car is adaptable for carrying the cargo of the general type which is supported on pallets or the like for facilitating the loading and unloading thereof from the car.

The underframe includes a center sill 13 from which there extend the usual bolsters and crossbearers 15 of which one is shown in FIG. 4. Fixed to the ends of the crossbearers and bolsters are side sills 14. Extending lengthwise of the car are a plurality of transversely spaced stringers 16 as shown in FIG. 4, which are mounted on and supported by the bolsters and crossbearers in the conventional manner.

The floor structure 10 may include a pair of transversely spaced wooden side boards extending lengthwise over the length of the car and mounted on the respective side sills 14 and an adjacent one of the stringers 16. Extending transversely between the lengthwise extending side boards 17 are a plurality of transversely extending wooden floor boards 18 which are fixed to the stringers and to the side boards 18 in the well known manner. The wooden floor boards 18 are of standardized thickness and width and are in side-by-side abutting relationship with the top surfaces 19 thereof, forming a substantially planar surface. Heretofore, the railway cars of the flat bed type utilizing wooden floor boards, the floor boards have extended continuously for the full length of the car without any interruption therein so that the car provided a substantially planar surface.

In accordance with the present invention, the floor structure 10 is formed with lengthwise movable floor board assemblies 19, which are raisable to form a platform on which the cargo or lading L may be supported in the manner, shown in FIG. 1, spanning adjacent ones of the floor board assemblies 19. The movable floor board assemblies 19 are space equivalent to the distance between the tines of a fork lift which are generally of standardized size and transverse spacing. When the movable floor board assemblies 19 are spaced in the manner to conform to the spacing of the tines, the lading may be lifted on and off the car 11 by means of a fork lift apparatus without the use of pallets because the tines may be easily positioned between the raised floor board assemblies 19 and the floor of the car.

In the embodiment shown in FIGS. 1 to 5, the floor board assemblies 19 each comprise a U-shaped channel 21 having a horizontal web 22 which is mounted on the stringers 16 and a pair of upstanding or vertical legs 23 and 24 which abut against adjacent floor boards 18 fixed to the underframe. The floor board assemblies 19 further each include a first floor board 26 and a second floor board 27, which when in side-by-side relation and in a rest position, substantially span the distance between the upright flanges 23 and 24 so as to form a continuation of the floor 10.

The first floor board 26 is mounted on the channel member 21 for pivotal movement by means of a plurality of transversely spaced hinge assemblies 28. The hinge assemblies 28 each comprise a hinge leaf 29 which is fixed to the upstanding leg 23 and a hinge leaf 31 which is fixed to the upper surface of the first floor board 26 within a recess as by screws. Pivotally connecting the hinge leaves is a pintle 32.

The first floor board 26 is pivotally connected to the second floor board 27 by transversely spaced hinge assemblies 33 which are constructed and arranged to permit limited separation of the second floor board relative to the first floor board. To this end each of the hinge assemblies 33 comprises a hinge plate 34 which is fixed to the underside of the first floor board 26 by means of screws. The hinge plate carries at one end a pintle or a slide pin 36 which is received within a pair of elongate slots 37 formed by transversely spaced loops 38 which are fixed to the inner side of a hinge leaf 39. The hinge leaf 39 is pivotally connected by means of a pintle 41 to a hinge plate 42 fixed to the inner end of the second movable floor board 27.

Fixed to the outboard end of the second board 27 is a face plate 43 having a plurality of lengthwise spaced openings 44 into which there is fixed, as by a force fit, locating pins 46. In the raised position of the boards 26 and 27 the locating pins 46 are seated within openings 47 formed in the horizontal web 22. When thus seated, the boards are retained in the raised position. In the rest position the locating pins 46 are disposed within complementary located slots 48 and 49 formed in the flange 24 and adjacent the fixed floor board 18.

To facilitate the movement or positioning of the movable floor board assembly 19 from the planar position to the raised lading supporting position, there is formed in the second floor board a plurality of transversely spaced hand recesses 50 of which each is reinforced by means of plates 51 which extend from the inner edge of the board 27 to a position partially overlying the recesses 50 to provide hand grips.

For raising the board assembly 19, the operator extends his hand into one or more of the hand recesses 50 and lifts the board 27 upwardly. Upon such upward lifting the second board 27 pivots relatively to the first board 26 about the hinge assemblies 33 as shown in FIG. 5. As the board 27 is being raised the lower ends of the loops 38 in engagement with the slide pins 36 are operative to also raise the first floor board 26 so that the latter also pivots about the hinge assemblies 28 fixed to the upstanding leg 23 of the channel 21 to the raised position shown in FIG. 5. When the board 28 is released, the loops 38 carried thereon slide on the pins 36 whereupon the locating pins enter the openings 47 in the web 22 of the channel 21 to maintain the boards 26 and 27 in the erect position. In connection with the slide loops 38, it is to be observed that these loops 58 are accommodated within recessed portions 52 provided adjacent the inner end of the first board 26 so that the inner faces of the boards 26 and 27 are in substantially planar abutting relationship.

In the upright position, the boards 26 and 27 are in an erect or endwise position providing the surface area of the two ends of the boards 26 and 27 for a support on which the cargo may be placed when another of the board assemblies 19 is raised as shown in FIG. 1. Moreover, the upper ends of the boards 26 and 27 are spaced from the upper faces of the fixed floor boards 18 a sufficient distance to accommodate the thickness of the tines of a fork lift so that the latter may be used to load or unload the cargo from the car.

It is to be noted that the second board 27 is of lesser thickness than the first board 26 to accommodate the structure of the hinge assembly 33. To compensate for this difference and thickness and to maintain the second board 27 level with the first board 26 and the fixed boards 10 in the rest or normal position there is provided a filler plate 52 which is fixed to the horizontal web 22 of the channel as by screws or bolts.

In order to return the floor boards 26 and 27 to the at rest position shown in FIG. 3, the floor board 27 is lifted so that the loops 38 move upwardly relative to the slide pins 36 of the hinge assemblies 33. When the floor board 27 reaches the phantom line position shown in FIG. 2 the locating pins 46 are clear of the openings 47, whereupon the second floor board 27 may be turned about the pintle 41 and returned to the at rest position with the locating pins 46 disposed within the slots 48 and 49 as shown in FIG. 2.

The movable floor board assemblies 19 providing the pallet-like platform may each be formed of a continuous length extending across the car, or, as shown, of separate two sections 19—19 in end-to-end relationship. The advantage of the two section board assembly resides in the fact that it will be easier to manipulate than a singular board assembly.

Referring now to FIGS. 6 and 7 there is shown a second embodiment of movable floor board assembly 100 which may be incorporated into the floor structure in a manner simmial to that explained above in connection with the embodiment of FIGS. 2 and 5 to accommodate the standardized spacing between the tines of a fork lift.

The movable floor board assembly 100 comprises a a channel member 110 having a horizontal web 111 and spaced upright legs 112 and 113. Extending from the leg 112 is a horizontally disposed lip 114. The other leg 113 abuts against one of the fixed floor boards 18.

Connected to the upright leg 112 and the horizontal lip 113 are transversely spaced hinge assemblies 115, each including a hinge bracket 116 to which there is connected by means of a pivot pin 117 one end of a hinge lever 118. The other end of the hinge lever 118 is connected by means of a pivot pin 121 to a hinge bracket 122 which is fixed to a transversely extending upright plate 123 of a floor board assembly 120. The upper end of the plate 123 is formed with a horizontal flange 124 which has fixed thereon and supports a floor plate 126. The floor plate 126 is also supported by a horizontal flange 127 of a second lengthwise spaced upright plate 128. Extending between the upstanding plates 126 and 127 is a plurality of transversely spaced reinforcing plates 129 which are aligned with rib plates 131 fixed to and extending from the outboard face of the support plate 123.

Connected to the second upstanding plate 228 is a plurality of transversely spaced hinge assemblies 130. Each of the hinge assemblies 130 includes a hinge bracket 132 which is pivotally connected at its lower end by means of a pivot pin 131 fixed to the plate 228 and to a hinge bracket 133 extending from an upstanding plate 134 which is fixed along its opposite face to transversely spaced attachment plates 136 embedded within a wooden board 137 of a floor board assembly 138. Mounted on the top surface of the wooden board 137 is a metal floor plate 139 which is held in position by a screw and nut assembly.

The floor board assemblies 120 and 138 are of lesser thickness than the fixed floor boards 18 so that filler blocks 142 and 143 are fixed to the channel web 110 to maintain the floor plates 126 and 139 of the assemblies 120 and 138 in co-planar relationship with respect to each other and the wooden floor boards 18 in the rest or recessed position of the boards as shown in FIG. 7.

To raise the floor board assemblies 120 and 138 from the rest position with respect to the floor boards 18, the floor board assembly 138 may be provided with hand holes similar to that shown in FIGS. 2 to 5, and the second floor board assembly 138 lifted so that the latter pivots relatively to the floor board assembly 120 and about the hinge assemblies 130. At the same time the board assembly 120 pivots about the hinge assembly 114 until the board assemblies 120 and 138 assume the position shown in FIG. 6. The board assemblies 120 and 138 are positioned so that the floor plate 126 is superposed on the floor board 18 with the wooden board 137 of the floor board assembly 138 resting on the reinforcing plates 125 and ribs 131 of the floor board assembly 138. The floor plate 139 is thus exposed to provide a platform on which the lading L may be supported.

To reposition the floor board assembly into its planar position, the second floor board assembly 138 is moved to a vertical position so that upon the application of an upward force the first floor board assembly 120 is turned about the hinge assembly 114 and returned to the rest position so that the floor plates 126 and 139 are in planar alignment as shown in FIG. 7.

What is claimed is:

1. A freight vehicle having an underframe and a floor extending the length of said underframe, said floor comprising a plurality of transversely extending floor board means fixed to said underframe in co-planar relationship with one another, said floor including at least one set of two lengthwise spaced floor board assemblies movable into and out of planar relationship with said fixed floor board means, each assembly providing two raised pivotally interconnected floor sections when moved out of said planar relationship for supporting with the other assembly lading in spanning relationship on the assemblies, and each floor assembly being separated by one of said fixed floor board means and accommodating the reception of the tines of a lift fork between the assemblies.

2. The invention as defined in claim 1 wherein said floor board sections includes a first floor board section pivotally mounted on said underframe for movement relative to said fixed floor board means, and a second floor board section pivotally connected to said first floor board section so as to be foldable relative thereto.

3. The invention as defined in claim 1 wherein said floor board assemblies each comprise a transversely extending channel member fixed in a space between two of said fixed floor board means, said channel member including a pair of upstanding legs abutting adjacent ones of said fixed floor board means, said floor sections including a first floor board section disposed in said channel member and a second floor board section disposed in said channel member in side-by-side relationship with said first floor board section, hinge means connecting said first floor board section to said channel member for pivotal movement between a horizontal position within said channel to a raised upright position, and hinge means connecting said second floor board section to said first floor board section so as to be foldable relative thereto and movable from a horizontal position to a raised upright position adjacent to said first floor board section.

4. The invention as defined in claim 3 wherein said hinge means connecting said first and second floor board section includes means permitting relative separation therebetween.

5. The invention as defined in claim 3 wherein said second floor board section includes pin means along one side thereof, and said channel member includes openings accommodating said pin means in the upright position for retaining said first and second floor board sections in said raised upright position.

6. A freight vehicle having an underframe and a floor extending the length of said underframe, said floor comprising a plurality of transversely extending floor board means fixed to said underframe in spaced apart co-planar relationship, said floor including at least one set of two lengthwise spaced floor board assemblies movable into and out of planar relationship with said fixed floor board means to provide two raised floor sections for supporting lading in spanning relationship thereon and separated by said fixed floor board means to accommodate the tines of a lift fork therein, said floor board assemblies each including a channel member of substantially U-shaped section fixed in a space between two of said fixed floor board means, a first floor board disposed within said channel member, means pivotally connecting said first floor board to said channel member for pivotal movement from a horizontal position with said floor to a horizontal position overlying one of said fixed floor board means defining one side of said space, a second floor board disposed in said channel member in side-by-side relationship with said first floor board and another of said fixed floor board means defining the other side of said space, means pivotally connecting the adjacent sides of said first and second floor boards so that said second floor board is movable between a horizontal position within said channel to a horizontal position overlying said first floor board when the latter overlies the one fixed floor board means.

7. A vehicle having an underframe and having a floor extending the length of said underframe, said floor comprising a plurality of transversely extending floor board means fixed to said underframe in spaced apart co-planar relation, said floor including at least a pair of recesses and one set of two lengthwise spaced floor board assemblies each movable into and out of a respective recess and into and out of planar relationship with said fixed floor board means for supporting lading, said floor board asemblies each providing two raised floor sections for supporting lading in spanning relation thereon and each being separated from the other by said fixed floor board means to accommodate the tines of a lift fork therein, said floor board assemblies each including floor section support means in each recess between two of said fixed floor board means, said one floor board disposed on said support means within said recess, first means pivotally connecting said one floor board to said support means for pivotal movement from a horizontal position with said floor to a raised position extending above said fixed floor board means, said other floor board disposed on said support in said recess in side-by-side relation with said one floor board and another of said fixed floor board means, second means pivotally connecting the adjacent sides of said one floor board and the other floor board so that said other floor board is movable between a horizontal position within said recess to a raised position extending above said recess when said one floor board extends above said recess.

8. The invention according to claim 7 and said first means pivotally connecting said one floor board to said support means extending out of said recess for pivotal movement of said one floor board from a horizontal position with said floor to a horizontal position overlying one of said fixed floor board means, and said second means pivotally connecting the adjacent sides of said one and other floor boards being provided with means extendable out of said recess so that said other floor board is movable between a horizontal position within said recess to a horizontal position overlying said one floor board when the latter overlies the one fixed floor board means.

9. The invention according to claim 7 and said second means pivotally connecting the adjacent sides of said one and other floor boards being extendable out of said recess and being constructed so that said one floor board is foldable in upright position relative to said other floor board and movable from a horizontal position to a raised upright position adjacent said one floor board in an upright position.

10. The invention according to claim 9 and locking means on each assembly receivable in a respective support means.

References Cited

UNITED STATES PATENTS

| | | | |
|---|---|---|---|
| 928,406 | 7/1909 | Strain | 105—375 |
| 938,958 | 11/1909 | Borrowdale | 105—375 |
| 1,531,932 | 3/1925 | Havn | 105—375 |

ARTHUR L. LA POINT, *Primary Examiner.*

R. A. BERTSCH, *Assistant Examiner.*

U.S. Cl. X.R.

248—119; 105—367

Notice of Adverse Decision in Interferences

In Interference No. 96,740 involving Patent No. 3,420,193, K. J. Austgen, FREIGHT VEHICLE FLOOR STRUCTURE, final judgment adverse to the patentee was rendered Sept. 12, 1969, as to claims 1, 2, 7 and 8.

[*Official Gazette October 28, 1969.*]